(No Model.)
J. J. CALLAGHAN & A. R. HORN.
CATTLE GUARD.
No. 489,601. Patented Jan. 10, 1893.
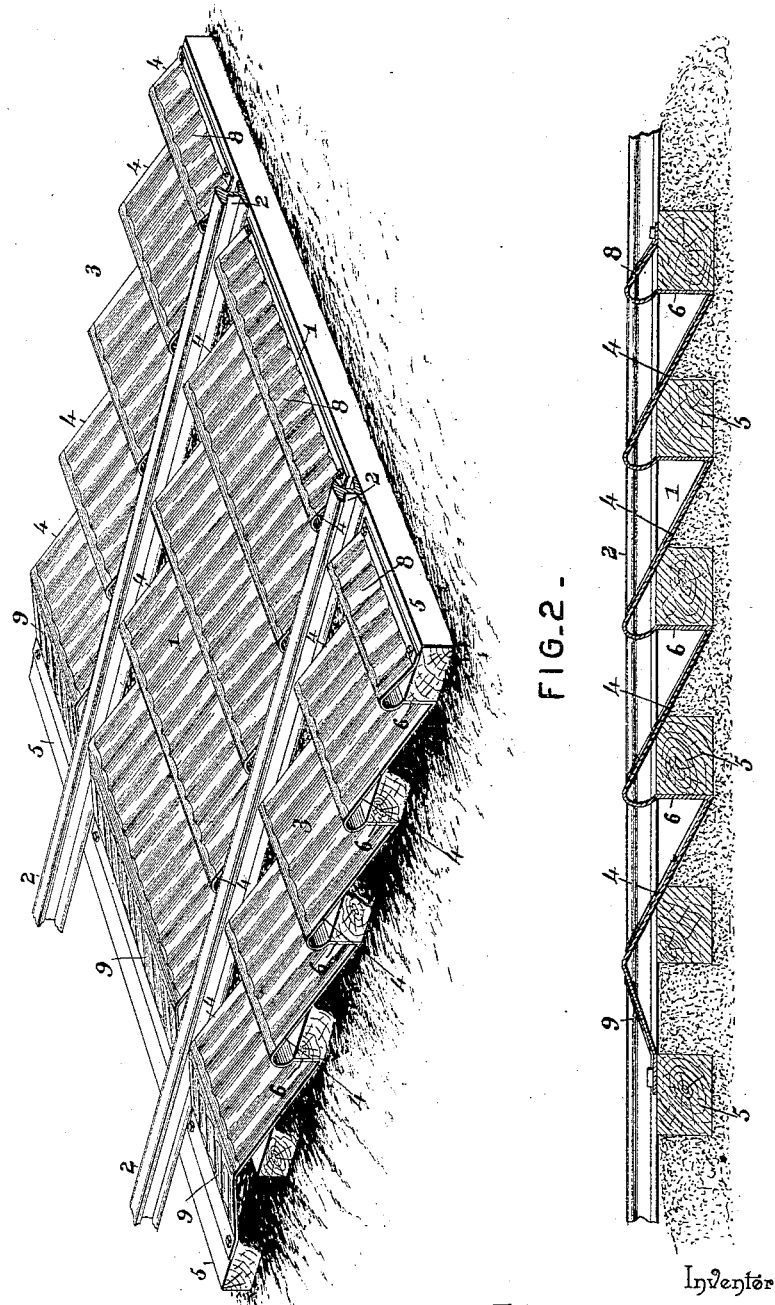
Witnesses
Jas. K. McCathran
H. T. Riley
By their Attorneys,
C. A. Snow & Co.
Inventors,
John J. Callaghan
Albro R. Horn

UNITED STATES PATENT OFFICE.

JOHN J. CALLAGHAN AND ALBRO R. HORN, OF STEVENS' POINT, WISCONSIN.

CATTLE-GUARD.

SPECIFICATION forming part of Letters Patent No. 489,601, dated January 10, 1893.

Application filed October 19, 1892. Serial No. 449,344. (No model.)

*To all whom it may concern:*

Be it known that we, JOHN J. CALLAGHAN and ALBRO R. HORN, citizens of the United States, residing at Stevens' Point, in the county of Portage and State of Wisconsin, have invented a new and useful Cattle-Guard, of which the following is a specification.

The invention relates to improvements in cattle guards.

The object of the present invention is to provide a cattle guard designed to be arranged on opposite sides of the highway to prevent the passage of cattle thereto, and capable of forcing an animal backward should it attempt to cross the cattle guard.

A further object of the invention is to provide one which will not injure an animal should it slip or fall on the guard.

The invention consists in the construction and novel combination and arrangement of parts hereinafter fully described, illustrated in the accompanying drawings and pointed out in the claims hereto appended.

In the drawings—Figure 1 is a perspective view of a cattle guard constructed in accordance with this invention. Fig. 2 is a longitudinal sectional view.

Like numerals of reference indicate corresponding parts in both figures of the drawings.

1 designates an inner section of a cattle guard extending longitudinally of a railroad track and nearly the width of the same, and having its side edges arranged within a short distance of the rails 2. On the outside of the rails are outer sections 3 having their inner edges arranged a short distance from the rails and designed to extend from the rails to the adjacent fences (not shown). Each section consists of a continuous sheet of metal and is composed of a series of inclined portions 4 extending from the base of one of the ties 5 upward to the top and across the next tie, and a series of vertical portions 6 secured to the corresponding faces of the cross-ties 5, whereby the inclined portions will extend longitudinally of the track the distance of the space between the cross-ties and the width of a tie. This space or distance is too great for an animal to step, and in attempting to cross the guard it will strike the inclined portion which will cause it to slip backward, and which will invariably cause an animal to back away from the guard as an animal in slipping backward will not endeavor to advance as would be the case were it slipping to either side when it might either attempt to advance or recede. The inclined portions are corrugated longitudinally to make an animal slip more easily, and in order to prevent an animal being scratched or otherwise injured in slipping, the vertical and inclined portions are connected at the top by a broad curved portion. The ends of each section are provided with short inclined portions 8 and 9 which are secured to the upper faces of the adjacent ties.

It will be seen that the cattle guard is simple, strong and durable, that it is capable of effectually preventing an animal crossing it, and that an animal will not be injured by it should the animal fall upon it in attempting to cross.

It is to be understood that changes in the form, proportion, and the minor details of construction may be resorted to without departing from the principle or sacrificing any of the advantages of this invention.

What we claim is—

1. A cattle guard section extending longitudinally of a track and consisting of a single sheet of metal and composed of a series of vertical portions and a series of inclined portions, the vertical portions being secured to similar faces of the ties, and the inclined portions each extending upward from the base of one tie to the top and across the adjacent tie, substantially as described.

2. A cattle guard section extending longitudinally of a track and consisting of a single sheet of metal and composed of a series of vertical portions and a series of inclined portions, and a series of curved portions connecting the upper ends of the vertical and inclined portions and presenting a broad smooth surface to avoid injuring animals, substantially as described.

3. A cattle guard section constructed of a single sheet of metal and consisting of a series of inclined portions provided with longitudinal corrugations, a series of vertical portions arranged to be secured to similar faces of cross-ties, and a series of curved portions connecting the upper ends of the inclined and vertical portions, substantially as described.

In testimony that we claim the foregoing as our own we have hereto affixed our signatures in the presence of two witnesses.

JOHN J. CALLAGHAN.
ALBRO R. HORN.

Witnesses:
R. H. BUTTERFIELD,
JESSE SMITH.